(12) United States Patent
Scheurich

(10) Patent No.: US 6,665,453 B2
(45) Date of Patent: *Dec. 16, 2003

(54) MULTI-RESOLUTION SUPPORT FOR VIDEO IMAGES

(75) Inventor: Christoph Scheurich, Santa Cruz, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,395

(22) Filed: Mar. 16, 1999

(65) Prior Publication Data

US 2003/0090571 A1 May 15, 2003

(51) Int. Cl.⁷ .................................................. H04N 7/18
(52) U.S. Cl. ........................................ 382/298; 358/1.2
(58) Field of Search ................................. 382/298–300, 382/148; 358/1.2; 348/207.1, 220.1, 222.1

(56) References Cited

U.S. PATENT DOCUMENTS

| 5,440,343 | A | * | 8/1995 | Parulski et al. ............. 348/220 |
| 5,920,657 | A | * | 7/1999 | Bender et al. .............. 382/284 |
| 6,031,569 | A | * | 2/2000 | Nobuoka et al. ........... 348/219 |
| 6,038,257 | A | * | 3/2000 | Brusewitz et al. ....... 348/14.14 |
| 6,072,492 | A | * | 6/2000 | Schagen et al. ............ 345/733 |

* cited by examiner

Primary Examiner—Thomas D. Lee
Assistant Examiner—Stephen Brinich
(74) Attorney, Agent, or Firm—Blakely, Sokoloff,. Taylor & Zafman LLP

(57) ABSTRACT

A method and apparatus that provides a high resolution still image. The method includes receiving a plurality of images in which high resolution image are interspersed with low resolution images. When a still image command is received, a high resolution image is retrieved from the plurality of images to be displayed.

42 Claims, 4 Drawing Sheets

MULTI-RESOLUTION SUPPORT FOR VIDEO IMAGES

(1) FIELD OF THE INVENTION

The invention relates to providing multi-resolution support for video images.

(2) RELATED ART

With the advent of powerful processors, one area that has developed rapidly is the digital processing capabilities of video images. In one example, video clips or continuous motion videos are transmitted over a transmission line or through a video medium such as tapes, disks or video cameras then processed by a processor for display on a display device. In the case of high resolution video images, the processor itself may have sufficient power to process the video images. However, problems generally exist in areas such as the video transmission bandwith and/or storage requirements. For example, to receive continuous videos of high resolution over a phone line, sophisticated hardware may be required to enhance the transmission bandwidth which generally results in overall increase to the cost of the video system. Further, a massive storage device may be required to store the high resolution videos resulting in further increase in cost to the system. Such increase to the cost of the video system may not be feasible where the market is competitive. Further, the cost may not be justified where low to medium resolution video images are adequate for visual purposes because generally, the human visual system is not sensitive to distortions in moving video images.

However, the above assertion may not be true for still images. Users unaware of distortions in low resolution moving images may immediately recognize the poor quality of the image when it is stilled. For example, a low resolution still image captured is generally blurry and pixel-like with the edges indefinite, and the colors are not crisp. Where a photo-like still image is desired for image analysis, zooming, or printout, the mentioned still image above is generally unacceptable.

In another instance, in a system where a digital camera is tethered to a computer, the digital camera may transmit video images at a predetermined rate to the computer. A processor in the computer processes the images and displays them in a viewfinder which may be located in a monitor. The user in turn views the viewfinder and captures a still image of a desired image for observation or printout. Because the still image is of low resolution, the captured image may not be desirable to the user. According to one method, the multi-resolution capability of the digital camera is used to solve this problem. Generally, digital video cameras are able to produce images in low, medium or high resolution, for example, 160×120 pixels, 320×240 pixels or 640×480 pixels. Thus, in viewfinder mode, the camera may be transmitting images at a low resolution of 160×120 pixels. When the user issues a still image command, perhaps through a mouse or a voice recognition device, to the computer, the computer transmits the command to the camera. The camera on receiving the command, switches to high resolution mode to transmit a high resolution still image before returning back to the viewfinder mode. However, the associated time latency from the time the command is issued may result in a display still image which is not what the user may have wanted.

BRIEF SUMMARY OF THE INVENTION

A method and apparatus is described which receives a plurality of images in which high resolution images are interspersed with low resolution images. When a still image command is received, a high resolution image is retrieved from the plurality of images to be displayed. Other features and advantages of the present invention will be apparent from the accompanying drawings and detailed description to be followed below.

BRIEF DESCRIPTION OF THE DRAWINGS

The present invention is illustrated by way of examples and not as limitations in which in the accompanying drawings.

DETAILED DESCRIPTION

A method and apparatus is described that receives high resolution images interspersed in a stream of low resolution images such that when a still image command is received, a high resolution image close in time to the command is retrieved for display.

Figure 1:
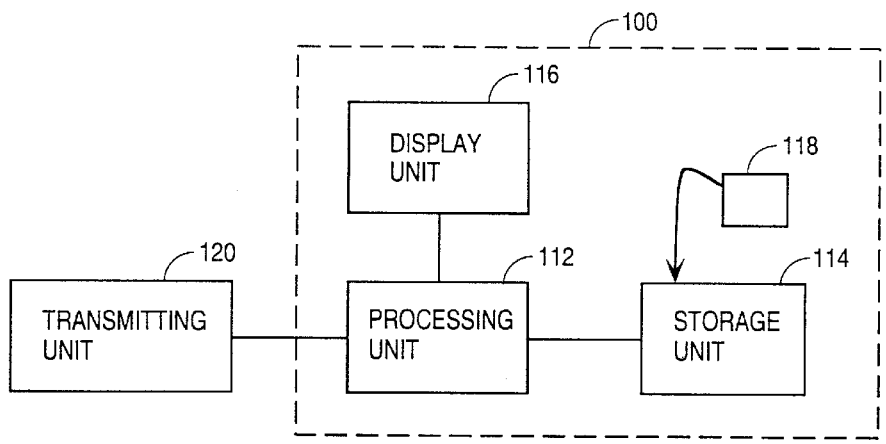
FIG. 1 illustrates an example of a video system in which an embodiment of the invention may be implemented.

FIG. 1 illustrates an example of a video system in which an embodiment of the invention may be implemented. The video system 100 comprises a processing unit 112 to process and/or direct the received video images to various units within the system. One destination of the video images may be a storage unit 114 such as a magnetic or an optical disk drive in which a storage disk 118 is fixed or is removable. Another example of a storage unit 114 is a magnetic video tape. Another destination of the video images may be a display unit 116 such as a monitor, liquid crystal display (LCD) or television, conventional or high definition (HDTV). Coupled to the video system 100 is a video transmitting unit 120 that transmits video images from a video tape or a video disk, for example. In another example, the transmitting unit 120 is a camera tethered to the video system. According to another example, the transmitting unit 120 is a separate entity such as a commercial station transmitting video images through wireless or cable transmission.

Figure 2:
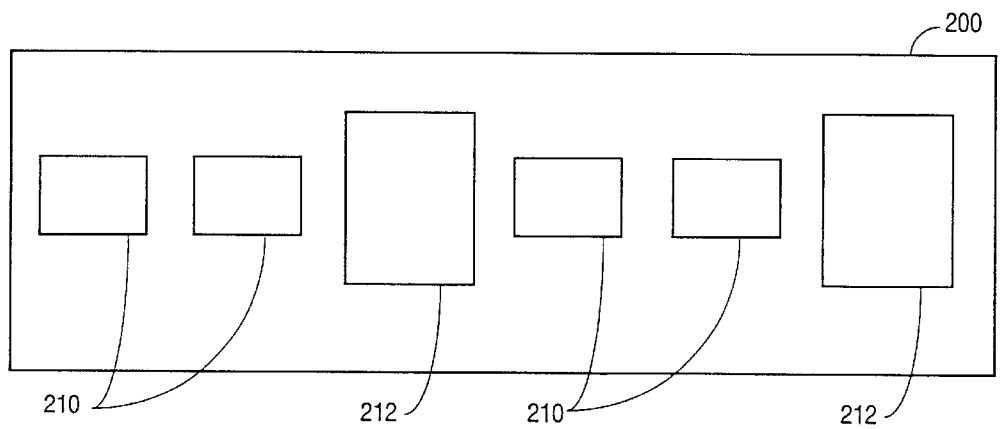
FIG. 2 is a diagram of a video image medium according to one embodiment of the invention.

FIG. 2 is an illustration of a video image medium according to one embodiment of the invention. According to one example, the medium 200 is magnetic or optical in which high resolution images 212 interspersed with low resolution images 210 is stored. Examples of a video image medium are a video tape or a video disk. The video image medium 200 can be inserted in a transmitting unit and when the transmitting unit is activated, it transmits the images of the video system 100. The images 210, 212, when received by the video system 100, is processed by the processing unit 112. Various methods may be used to allow the processing unit 112 to determine which image is high resolution and which image is low resolution. According to one method, a header is transmitted with the image containing image information which is processed by the processing unit 112. The header is a plurality of bits set according to the resolution of the image to follow. In another method, high resolution images are marked electronically such that the processing unit 112 detects the high resolution images during processing. For example, a digital code is inserted in the image at a predetermined location which is read by the processing unit 112. Of course, conventional methods used to determine one image resolution from another may also be used.

Figure 3:
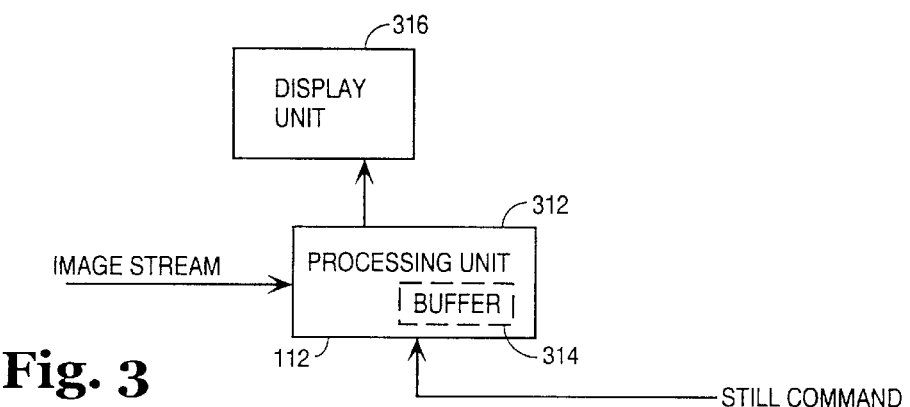
FIG. 3 is a diagram of a processing unit according to one embodiment of the invention.

FIG. 3 illustrates an embodiment of a processing unit 112 according to the invention. Where the frame rate is sufficiently high such that the removal of high resolution images from the low resolution images does not create "jerky" moving images on a display unit 316, in one example, the processing unit 312 simply removes the high resolution images from the stream of low resolution images. When a still image command is received, the processing unit 312 allows the next high resolution image to pass through to the display unit 316 for display. In another example, the processing unit 312 removes the high resolution images from the stream of low resolution images and stores them in a buffer 314 awaiting a still image command to be received. When a still image command is received, the processing unit 312 retrieves a high resolution image from the buffer to be sent to the display unit 316. In another method, where the removal of the high resolution images create jerky moving images on the display unit 316, the processing unit 312 stores a copy of the high resolution image in the buffer 314 and scales the original high resolution image to a lower resolution comparable to the stream of low resolution images. According to one method, scaling is performed in a manner similar to that performed by digital video camera described in FIG. 5. Regarding the buffer 314, according to one embodiment, the buffer 314 may be a first in first out (FIFO) buffer in which a previously stored image may be purged as a new image is received in the event the buffer is full. When a still image command is received by the processing unit 312, the processing unit 312 retrieves the high resolution image stored in the buffer 314 to be displayed in the display unit 316, for example. Once retrieved, the user may zoom, shrink or print the displayed high resolution image.

Figure 4:
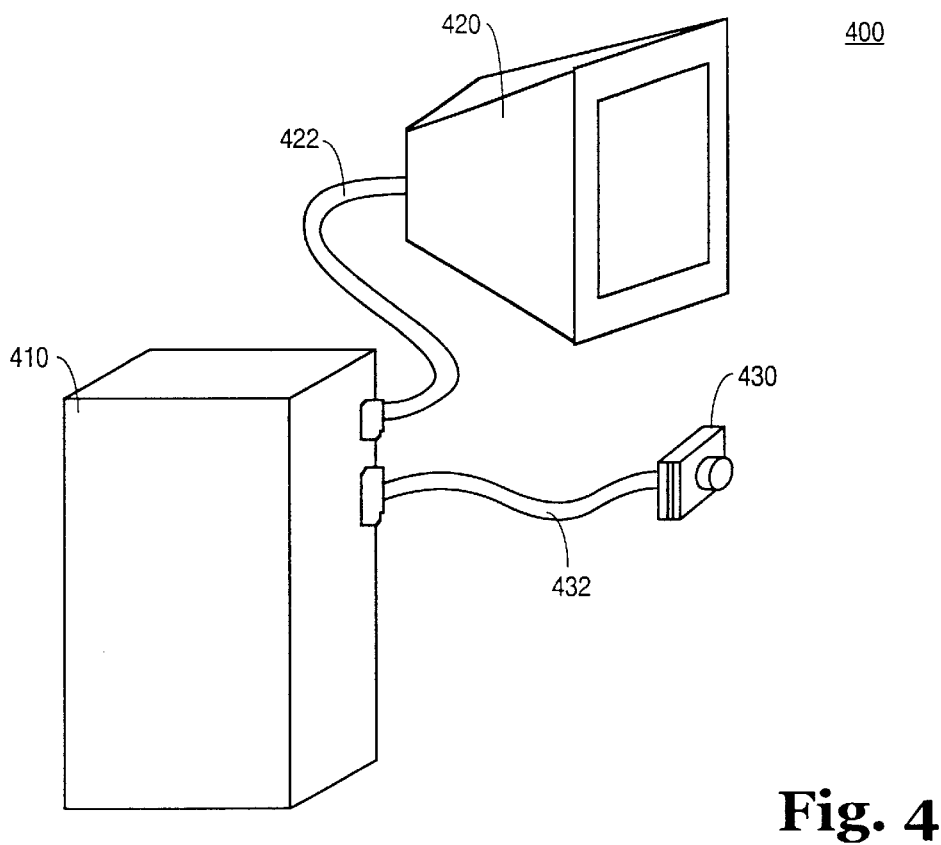
FIG. 4 is another example of a system in which an embodiment of the invention may be implemented.

FIG. 4 is another example of a system in which an embodiment of the invention may be implemented. The system 400 comprises a computer 410 to which a computer monitor 420 is coupled to via a display cable 422. Moving images are sent to the monitor 420 through a video controller (not shown) within the computer 410. Tethered to the computer 410 via a cable 432 such as a Universal Serial Bus (USB) cable, is a digital camera 430 used to capture images. The digital camera 430 generates multi-resolution images suitable for interspersing high resolution images within a stream of low resolution images. Digital cameras, in general, have multiple resolution capability when capturing images.

Figure 5:
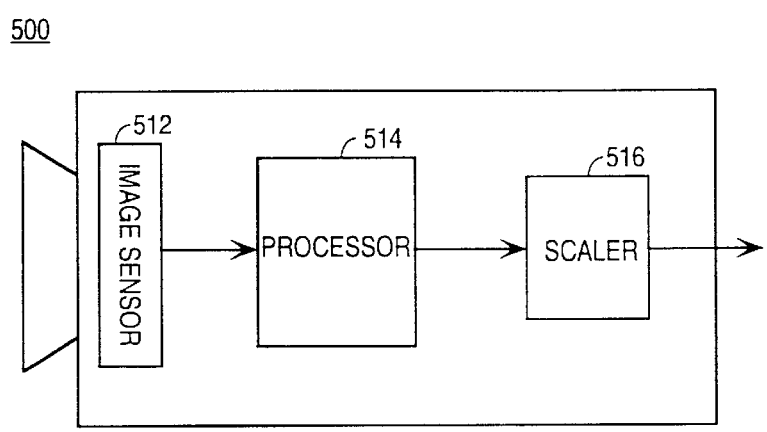
FIG. 5 is a diagram of a digital camera which may be used to generate high resolution images interspersed with low resolution images according to one embodiment of the invention.

FIG. 5 is an example of a digital video camera which may be used in generating high resolution images interspersed with low resolution images. The digital camera 500 comprises an image sensor array 512 which is used to capture an image of a scene when the camera 500 is activated. Because images are captured at predetermined intervals, the image sensor array 512 transmits a stream of images to the processor 514 for processing. According to an embodiment of the invention, the processor 514 determines which image should be transmitted at high resolution and which image should be transmitted at low resolution As the determination is made, the processor 514 sends a signal to a scaler 516 to scale the images according to the determined resolution which is then outputted from the camera 500. In one example, the image sensor array captures images at 640×480 pixels. According to the processor 514 instruction, the scaler passes the image at 640×480 pixels, or scale the image in a ratio of 1:2 to generate 320×240 pixel image, or scale the image in a ratio of 1:4 to generate 160×120 pixel image. Accordingly, the digital camera 500 is able to transmit images at the high resolution of 640×480 pixels, medium resolution of 320×240 pixels or low resolution of 160×120 pixels. Other resolutions may be transmitted according to a design criteria. Appropriately, according to one embodiment, the processor 514 marks the images to be transmitted to distinguish the different resolutions they are to be sent using various methods such as those described in FIG. 2.

While it is possible for a digital camera to transmit all images in high resolution and the receiving computer to process the received high resolution images, the consequence is that, generally, the computer hardware and processor requirements need to be adapted to continuously receive high resolution images. This generally results in a high cost computer which may not be market competitive. Additionally, the computer may require massive storage units to accommodate the high resolution video images if stored. As an example, a digital camera transmitting at 12 bits per pixel in a 160×120 pixel resolution at 15 images per second (fps) requires approximately 3.4 Mega bits/second (Mbps). The same camera transmitting at 320×240 pixel resolution at 15 fps requires 13.8 Mbps. While various image compression methods may be used to compress the images to a certain extent, the amount of compression that may be performed is generally limited. Additionally, compression and decompression in real time may be too slow to be feasible for generating moving, high resolution images. Further, even if it was feasible, the enhancement would generally be costly making the product uncompetitive in the market.

Furthermore, due to the information size of high resolution images, it may be difficult to transmit the images from one location to another due to bandwidth constraints in the communication channel. Therefore, aside from the visual aspect, there may be very limited usage for such high resolution moving video images which does not justify high cost computers that uses elaborate compression schemes. Generally, low to medium resolutions may be adequate for viewing moving video images. However, in producing a low resolution stream of images, problems generally exist where the user may wish to capture a photo-like or high quality still image. Generally, in a still image, the user will typically desire to capture the image at the highest possible resolution.

Figure 6:
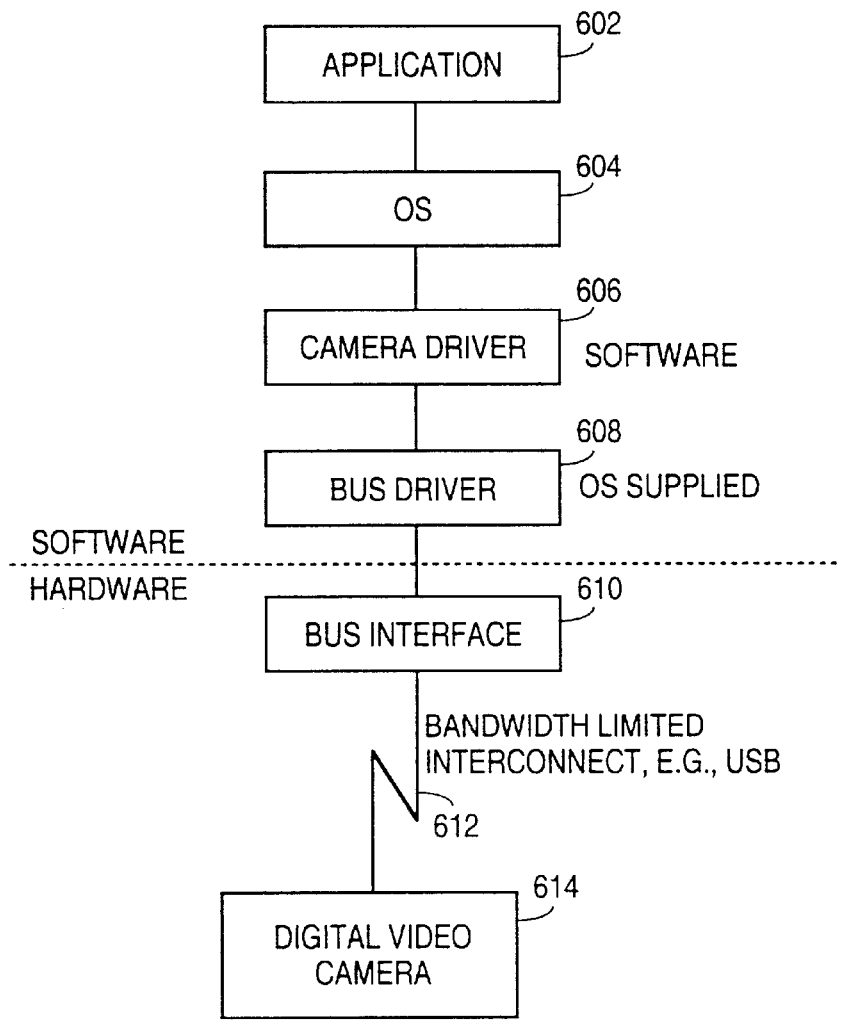
FIG. 6 is a diagram of an infrastructure which may allow high resolution still images to be captured when a digital camera transmits low resolution images according to one method.

FIG. 6 is a diagram of an infrastructure which allows high resolution still images to be captured when a digital camera transmits low resolution moving video images according to one method. The application program 602 streams the moving images into a view finder which is displayed on a display device 420 (see FIG. 4). When the application program 602 receives a still image command from the user, the application program 602 requests a high resolution still image from the operating system 604. The operating system 604 transmits the request to the camera driver 606. The camera driver 606 in turn transmits a still image command to the bus driver 608 in which a signal is sent via the bus interface 610 and through the cable 612 to the digital camera 614. The digital camera 614, on receiving a still image command, adjusts the resolution of an image so that a high resolution still image is transmitted to the computer. After transmitting the high resolution still images, the digital camera 614 reverts back to sending a stream of low resolution images. The high resolution still image is transmitted via the bus cable 612 to the bus interface 610 and to the application program 602. The application program 602, on receiving the high resolution still image, adjusts the viewfinder to display the image. The major disadvantage is that there is a very large time latency associated with on the fly switching of video resolutions. Further latency also results due to the real-time to display latency such as the viewfinder displaying an image delayed by some time from the time the image is captured due to the transmission from the source. In one example, the latency may exceed two seconds, which may be undesirable to a user requiring an immediate snap shot of the moving image. The latency may be attributed to the still image command being sent to the controlling operating system that, in turn, sends a signal to the camera driver that, in turn, commands the camera to change from a low resolution mode to a high resolution mode.

According to one embodiment of the invention, the digital camera intersperses high resolution images within a stream of low resolution images. For example, if the camera 500 (see FIG. 5) were to substitute a high resolution image for every fifth image while streaming low resolution images, a high resolution image would be sent approximately every 333 milliseconds. Therefore, if the user were to issue a still image command, in one embodiment, a maximum of 333 millisecond latency would result. Time latency may be further reduced if, for example, a high resolution image were substituted for every third image while streaming low resolution images. The number of high resolution images substituted in a stream of low resolution images may be determined according to bandwidth constraint and a desired result. A processing unit within the computer 410 (see FIG. 4) may determine which image is high resolution and which image is low resolution.

In accordance with one embodiment of the invention, a processing unit within the computer 410 includes a buffer that caches a limited number of high resolution images for potential future use. If the buffer cache a plurality of high resolution images, such as when a still image command is received by the processing unit, the processor determines the time latency of the high resolution images between the still command and produces the high resolution image closest to the still command. For example, assuming that every fifth image in the stream of low resolution images is a high resolution image. The high resolution image would be sent approximately every 333 milliseconds. When the still image command is received between two high resolution images, the closest high resolution image would be selected thereby having a time latency of +/−166 milliseconds maximum.

Figure 7:
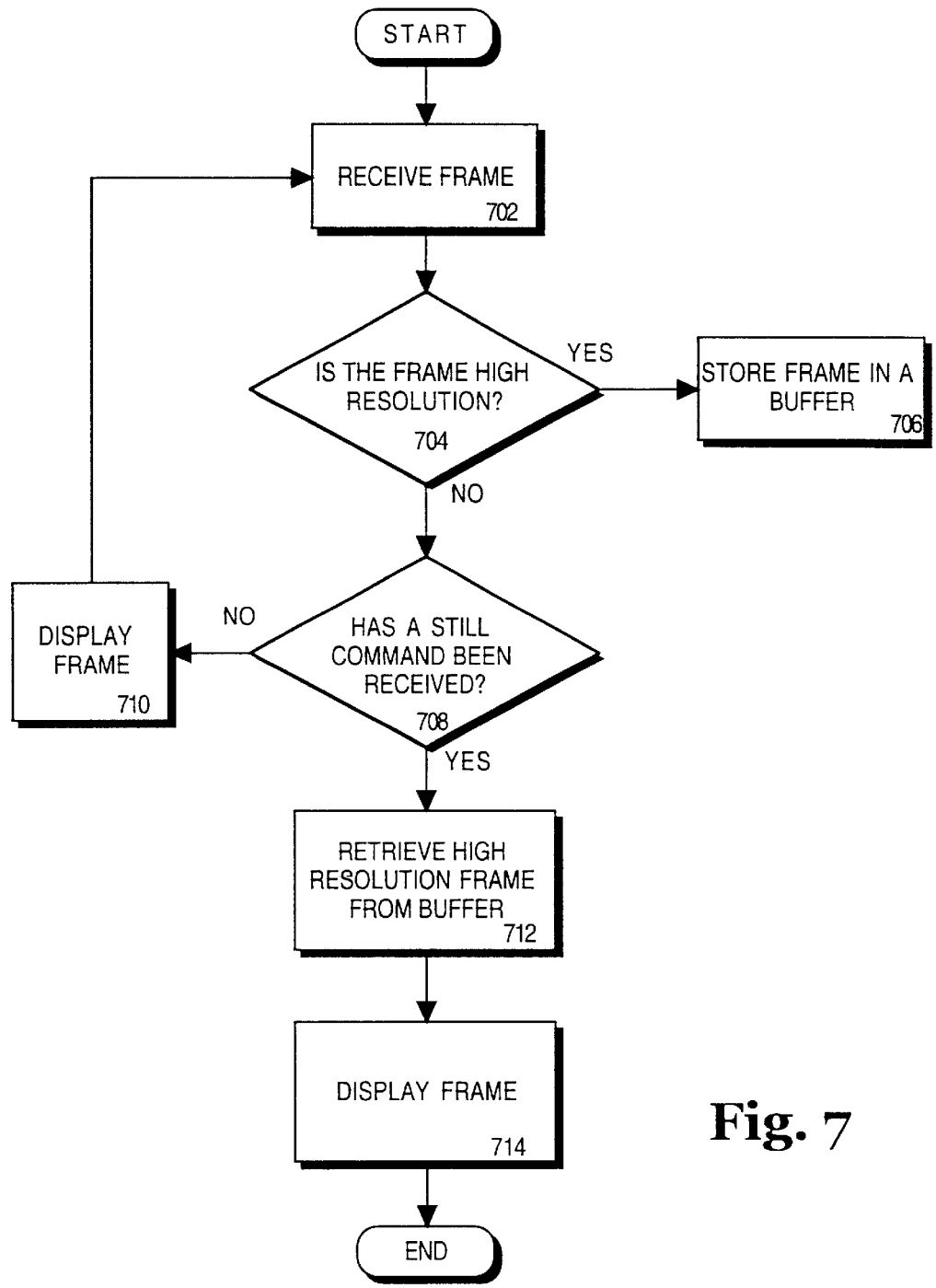
FIG. 7 is a flow chart for capturing high resolution still images according to one embodiment of the invention.

FIG. 7 is a flow chart according to one embodiment of the invention. In block 702, a video system receives a stream of video images in which high resolution images are interspersed with low resolution images. In block 704, a processing unit within the video system determines if an image is high resolution or low resolution. In one example, the processing unit simply removes the high resolution images. In another example, the processing unit scales the high resolution images to be comparable to the low resolution images. In block 706, in a processing unit with a buffer, the processing unit may store the high resolution images in a buffer. In the event the buffer becomes full, the processing unit purges the first received high resolution images on a first-in-first-out basis. In a processing unit without a buffer, the processing unit simply purges the high resolution images as detected or scale the high resolution images into low resolution images. In block 708, the processing unit determines if a still image command has been received. If not, in block 710, the processing unit sends the low resolution images to a display unit to be displayed. If a still image command is received, in block 712, in a processing unit with a buffer, the high resolution image will be retrieved from the buffer which in block 714 will be displayed on the display unit. In a processing unit that does not have a buffer, the processing will retrieve from the streaming video images, a high resolution image which in block 714 will be displayed on the display unit.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than in a restrictive sense.

What is claimed is:

1. A method comprising:

receiving a plurality of images in which high resolution images are interspersed with low resolution images;

determining if a still image command is received;

retrieving one of said high resolution images from said plurality of images; and displaying said retrieved high resolution image, wherein if said still image command has not been received, purging at least one of said high resolution images from said plurality of images.

2. The method according to claim 1, wherein if said still image command has not been received, purging all of said high resolution images from said plurality of images.

3. The method according to claim 1, further comprising:

detecting said high resolution images in said plurality of images;

retrieving said high resolution images; and storing said high resolution images in a buffer.

4. The method according to claim 1, further comprising:

scaling said high resolution images to a resolution comparable to said low resolution images.

5. The method according to claim 3, wherein if said still image command is received, retrieving one of said high resolution images from said buffer.

6. The method according to claim 3, wherein if said still image command is received, comparing time latency between two high resolution images in relation to said still image command and displaying one of said high resolution images close in time to said still image command.

7. The method of claim 3, wherein the at least one of said high resolution images purged from said plurality of images was stored in said buffer before any other of said high resolution images.

8. An apparatus comprising:

a first circuit to receive a plurality of images in which high resolution images are interspersed with low resolution images, a second circuit coupled to said first circuit to distinguish between said high resolution images and said low resolution images;

a third circuit to receive a still image command; and a fourth circuit coupled to said second and said third circuit to retrieve a high resolution image from said plurality of images when said third circuit receives said still image command, wherein if said still image command has not been received by said third circuit, purging at least one of said high resolution images from said plurality of images.

9. The apparatus of claim 8, wherein said second circuit is configured to distinguish said high resolution images from said low resolution images by receiving a header having resolution information accompanying at least one of said high resolution images and low resolution images.

10. The apparatus of claim 8, wherein said second circuit is configured to distinguish said high resolution images from said low resolution images by detecting an electronic marker on said high resolution images.

11. The apparatus of claim 8, wherein said second circuit is configured to retrieve said high resolution images, said apparatus further comprising a buffer to store said retrieved high resolution images.

12. The apparatus of claim 11, wherein when said third circuit receives said still image command, said fourth circuit is configured to retrieve from said buffer said high resolution image close in time to said still image command.

13. The apparatus of claim 8, further comprising:

a fifth circuit to scale said high resolution images to a resolution comparable to said low resolution images.

14. The apparatus of claim 8, wherein if said still image command has not been received, purging all of said high resolution images from said plurality of images.

15. The apparatus of claim 11, wherein the at least one of said high resolution images purged from said plurality of images was stored in said buffer before any other of said high resolution images.

16. A system comprising:

a processing unit configured to receive a plurality of images in which high resolution images are interspersed with low resolution images, said processing unit configured to distinguish between said high resolution images and said low resolution images, said processing unit further configured to receive a still image command, said processing unit configured to retrieve a high resolution image from said plurality of images on receiving said still image command; and a display unit coupled to said processing unit to display said retrieved high resolution image, wherein if said still image command has not been received, said processing unit purging at least one of said high resolution images from said plurality of images.

17. The system of claim 16, further comprising:

a transmitting unit coupled to said processing unit, said transmitting unit configured to transmit said plurality of images in which high resolution images are interspersed with low resolution images.

18. The system of claim 17, wherein said transmitting unit is a digital camera.

19. The system of claim 17, wherein said transmitting unit is a video medium drive configured to receive a video medium having said plurality of images in which high resolution images are interspersed with low resolution images.

20. The system of claim 17, wherein said transmitting unit is a commercial station.

21. The system of claim 18, wherein said digital camera further comprises:

an image sensor array;

a processor coupled to said image sensor array; and a scalar coupled to said processor to scale said images generated by said image sensor array.

22. The system of claim 16, wherein said processing unit is configured to distinguish said high resolution images from said low resolution images by receiving a header having resolution information accompanying at least one of said high resolution images and low resolution images.

23. The system of claim 16, wherein said processing unit is configured to distinguish said high resolution images from said low resolution images by detecting an electronic marker on said high resolution images.

24. The system of claim 16, wherein said processing unit is configured to retrieve said high resolution images after distinguishing said high resolution images from said low resolution images, said processing unit further including a buffer to store said retrieved high resolution images.

25. The system of claim 24, wherein when said processing unit receives said still image command, said processing unit is configured to retrieve from said buffer said high resolution image close in time to said still image command.

26. The system of claim 16, wherein if said still image command has not been received, purging all of said high resolution images from said plurality of images.

27. The apparatus of claim 24, wherein the at least one of said high resolution images purged from said plurality of images was stored in said buffer before any other of said high resolution images.

28. A method comprising:

receiving a plurality of images in which high resolution images are always simultaneously interspersed with low resolution images in a pattern at one of a predetermined rate and a rate determined by bandwidth of a bus;

determining if a still image command is received;

retrieving one of said high resolution images from said plurality of images; and displaying said retrieved high resolution image.

29. An apparatus comprising:

a first circuit to receive a plurality of images in which high resolution images are always simultaneously interspersed with low resolution images in a pattern at one of a predetermined rate and a rate determined by bandwidth of a bus coupled to said first circuit, a second circuit coupled to said first circuit to distinguish between said high resolution images and said low resolution images;

a third circuit to receive a still image command; and a fourth circuit coupled to said second and said third circuit to retrieve a high resolution image from said plurality of images when said third circuit receives said still image command.

30. A system comprising:

a processing unit configured to receive a plurality of images in which high resolution images are always simultaneously interspersed with low resolution images at one of a predetermined rate and a rate determined by bandwidth of a bus coupled to said processing unit, said processing unit configured to distinguish between said high resolution images and said low resolution images, said processing unit further configured to receive a still image command, said processing unit configured to retrieve a high resolution image from said plurality of images on receiving said still image command; and a display unit coupled to said processing unit to display said retrieved high resolution image.

31. A method comprising:

receiving a plurality of images in which high resolution images are always simultaneously interspersed with low resolution images;

determining if a still image command is received;

retrieving one of said high resolution images from said plurality of images; and displaying said retrieved high resolution image.

32. The method of claim 31, wherein high resolution images are simultaneously interspersed with low resolution images at a predetermined rate.

33. The method of claim 31, wherein high resolution images are simultaneously interspersed with low resolution images at a rate determined by bandwidth of a bus.

34. The method of claim 31, wherein high resolution images are simultaneously interspersed with low resolution images at a rate determined by desired resolution.

35. An apparatus comprising:

a first circuit to receive a plurality of images in which high resolution images are always simultaneously interspersed with low resolution images, a second circuit coupled to said first circuit to distinguish between said high resolution images and said low resolution images;

a third circuit to receive a still image command; and a fourth circuit coupled to said second and said third circuit to retrieve a high resolution image from said plurality of images when said third circuit receives said still image command.

36. The apparatus of claim 35, wherein high resolution images are simultaneously interspersed with low resolution images at a predetermined rate.

37. The apparatus of claim 35, wherein high resolution images are simultaneously interspersed with low resolution images at a rate determined by bandwidth of a bus coupled to said first circuit.

38. The apparatus of claim 35, wherein high resolution images are simultaneously interspersed with low resolution images at a rate determined by desired resolution.

39. A system comprising:

a processing unit configured to receive a plurality of images in which high resolution images are always simultaneously interspersed with low resolution images, said processing unit configured to distinguish between said high resolution images and said low resolution images, said processing unit further configured to receive a still image command, said processing unit configured to retrieve a high resolution image from said plurality of images on receiving said still image command; and a display unit coupled to said processing unit to display said retrieved high resolution image.

40. The system of claim 39, wherein high resolution images are simultaneously interspersed with low resolution images at a predetermined rate.

41. The system of claim 39, wherein high resolution images are simultaneously interspersed with low resolution images at a rate determined by bandwidth of a bus coupled to said processing unit.

42. The system of claim 39, wherein high resolution images are simultaneously interspersed with low resolution images at a rate determined by desired resolution.

* * * * *